United States Patent
Zhang et al.

(10) Patent No.: US 12,265,753 B2
(45) Date of Patent: Apr. 1, 2025

(54) VOLUME ADJUSTMENT METHOD AND DEVICE, AND SYSTEM

(71) Applicant: Huawei Technologies Co., Ltd., Shenzhen (CN)

(72) Inventors: Hanbing Zhang, Xi'an (CN); Jie Li, Shenzhen (CN); Xiang Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

(21) Appl. No.: 17/789,072

(22) PCT Filed: Oct. 22, 2020

(86) PCT No.: PCT/CN2020/122766
§ 371 (c)(1),
(2) Date: Jun. 24, 2022

(87) PCT Pub. No.: WO2021/129090
PCT Pub. Date: Jul. 1, 2021

(65) Prior Publication Data
US 2023/0054865 A1 Feb. 23, 2023

(30) Foreign Application Priority Data
Dec. 27, 2019 (CN) .......................... 201911381066.9

(51) Int. Cl.
*G06F 3/16* (2006.01)
*H04M 1/72442* (2021.01)

(52) U.S. Cl.
CPC ......... *G06F 3/165* (2013.01); *H04M 1/72442* (2021.01)

(58) Field of Classification Search
CPC ............................ G06F 3/16; H04M 1/72442
USPC .................. 381/107, 104, 109; 455/219, 220
See application file for complete search history.

(56) References Cited

U.S. PATENT DOCUMENTS

| | | | |
|---|---|---|---|
| 9,204,093 B1 * | 12/2015 | Zhang | .................. A63F 13/798 |
| 2016/0173046 A1 | 6/2016 | Lee | |
| 2018/0329675 A1 | 11/2018 | Lee et al. | |

FOREIGN PATENT DOCUMENTS

| | | |
|---|---|---|
| CN | 102693722 A | 9/2012 |
| CN | 104599690 A | 5/2015 |
| CN | 105280203 A | 1/2016 |
| CN | 103456334 B | 4/2016 |

(Continued)

*Primary Examiner* — Vivian C Chin
*Assistant Examiner* — Con P Tran
(74) *Attorney, Agent, or Firm* — Slater Matsil, LLP

(57) ABSTRACT

Embodiments of this application provide a volume adjustment method and device, and a system. The method includes: A first terminal device sends a first playback request to a server, where the first playback request carries a model of the first terminal device and an identifier of the first audio. The server determines a first volume value of the first audio based on the identifier of the first audio and the model of the first terminal device. The server determines, based on the first volume value and a preset volume threshold of the first terminal device, a first volume gain. The first terminal device determines, based on the first volume gain and a currently set second volume value, a first target volume value. The first terminal device adjusts volume of playing the first audio to the first target volume value.

18 Claims, 4 Drawing Sheets

(56) References Cited

FOREIGN PATENT DOCUMENTS

| | | | |
|---|---|---|---|
| CN | 105653234 A | | 6/2016 |
| CN | 106331338 A | | 1/2017 |
| CN | 106454399 A | * | 2/2017 |
| CN | 107562406 A | | 1/2018 |
| CN | 107566618 A | | 1/2018 |
| CN | 108270913 A | | 7/2018 |
| CN | 108737648 A | * | 11/2018 |
| CN | 109240637 A | | 1/2019 |
| CN | 110543289 A | | 12/2019 |
| CN | 111163226 A | | 5/2020 |

* cited by examiner

VOLUME ADJUSTMENT METHOD AND DEVICE, AND SYSTEM

CROSS-REFERENCE TO RELATED APPLICATIONS

This application is a national stage of International Application No. PCT/CN2020/122766, filed on Oct. 22, 2020, which claims priority to Chinese Patent Application No. 201911381066.9, filed on Dec. 27, 2019. Both of the aforementioned applications are hereby incorporated by reference in their entireties.

TECHNICAL FIELD

This application relates to the field of terminal technologies, and more specifically, to volume adjustment method and apparatus, and a terminal device in the field of terminal technologies.

BACKGROUND

Currently, most audio played by an audio playback device comes from different audio operators. Volume varies during audio recording by different audio operators. In this way, when same playback volume is set in the playback device, there is a significant volume difference for different audio.

Therefore, when a user is listening to audio, a voice fluctuates between different audio, which affects user experience.

SUMMARY

Embodiments of this application provide a volume adjustment method and device, and a system, to reduce a volume perception difference when a user plays different audio, thereby improving user experience.

According to a first aspect, an embodiment of this application provides a volume adjustment method. The method includes:

A first terminal device sends a first playback request to a server, where the first playback request is used to request to play first audio on the first terminal device, and the first playback request carries a model of the first terminal device and an identifier of the first audio.

The server determines a first volume value of the first audio based on the identifier of the first audio and the model of the first terminal device.

The server determines, based on the first volume value and a volume threshold of the first terminal device, a first volume gain for playing the first audio on the first terminal device.

The server sends first volume control information to the first terminal device, where the first volume control information is used to indicate the first volume gain.

The first terminal device determines, based on the first volume gain and a second volume value currently set by the first terminal device, a first target volume value for playing the first audio on the first terminal device.

The first terminal device adjusts volume of playing the first audio to the first target volume value.

Optionally, the volume adjustment method provided in this embodiment of this application may be used to adjust volume of playing audio, or may be used to adjust volume of playing a video, or may be used to adjust volume of another file that can be listened to and played on the first terminal device. This is not limited in this embodiment of this application.

It should be noted that a volume value in this embodiment of this application usually does not indicate an absolute volume value. The volume value in this embodiment of this application is a specific value, and the value indicates a proportional relationship between playback volume corresponding to the volume value and maximum playback volume of the first terminal device. A larger volume value indicates higher playback volume corresponding to the volume value, and a smaller volume value indicates lower playback volume corresponding to the volume value.

It should be further noted that the first volume value in this embodiment of this application is a volume value with a good effect when the first audio is listened to.

Optionally, the server may determine the first volume value of the first audio in a plurality of manners based on the identifier of the first audio and the model of the first terminal device. This is not limited in this embodiment of this application.

In a possible implementation, the server may receive a plurality of volume values, where the plurality of volume values include volume values used when a plurality of users play the first audio by using terminal devices that are of a same model as the first terminal device; and determine the first volume value based on the plurality of volume values. In the plurality of volume values, some values are the same, and some values are different.

For example, the server may use a volume value that appears most frequently in the plurality of volume values as the first volume value.

For another example, the server may use an average value of the plurality of volume values as the first volume value.

That is, the server may obtain, through big data statistics, a volume value with a good effect when audio is played on a terminal device of a model.

In another possible implementation, the server may determine the first volume value of the first audio based on the identifier of the first audio, the model of the first terminal device, and volume information. The volume information includes a mapping relationship between the identifier of the first audio, the model of the first terminal device, and the first volume value.

It should be noted that the volume information includes a mapping relationship between an audio identifier, a device model, and a volume value, and is used to indicate a volume value with a good effect when audio is played on a terminal device of a model.

Optionally, the server may obtain the volume information in a plurality of manners. This is not limited in this embodiment of this application.

In a first possible implementation, a person skilled in the art may configure the volume information for the server in advance.

In a second possible implementation, before the server determines the first volume value of the first audio based on the identifier of the first audio and the model of the first terminal device, the server may obtain the volume information through big data statistics, and locally store the volume information. Correspondingly, the server may invoke the locally stored volume information.

In a third possible implementation, the server may obtain the volume information from another terminal device.

It should be noted that the volume threshold in this embodiment of this application is a default volume value configured at delivery of the first terminal device. The default volume value may be measured by a person skilled in the art by using a professional measurement device before delivery. Therefore, it may be considered that a performance effect of the first terminal device is good when standard audio is played on the first terminal device with volume corresponding to the default volume value.

Optionally, the server may obtain the volume threshold in a plurality of manners. This is not limited in this embodiment of this application.

In a possible implementation, a person skilled in the art may preconfigure volume threshold information for the server. The volume threshold information includes a mapping relationship between the device model and the volume threshold.

In another possible implementation, the server may receive the volume threshold from another device, for example, a professional measurement device.

It should be noted that, when the first terminal device is used to play different audio, because volume varies during audio recording by different audio operators, a volume value (for example, the first volume value) with a good listening effect may vary to different degrees. That is, if the volume during audio recording is high, the first volume value is small; or if the volume during audio recording is low, the first volume value is large.

However, the default volume value configured at delivery (for example, the volume threshold) is a volume value with a good performance effect when the standard audio is played on the first terminal device. Therefore, for audio recorded by different audio operators, there is a difference between a volume value with a good listening effect and the default volume value. Therefore, the difference between the two volume values may be equalized by using the first volume gain.

It should be further noted that, because a performance effect of the first terminal device is good when the standard audio is played on the first terminal device with volume corresponding to the default volume value, it may be considered that a volume gain corresponding to the volume threshold is 1, that is, volume corresponding to the volume threshold is volume with good performance, and a volume increase or decrease operation does not need to be performed.

In a possible implementation, the server may determine the first volume gain based on the first volume value, the volume threshold of the first terminal device, and first gain information. The first gain information includes a mapping relationship between a volume value and a volume gain.

It should be noted that, in the first volume gain information, one volume gain may correspond to at least one volume value. When one volume gain corresponds to a plurality of volume values, it may be understood that the volume gain corresponds to a volume value range, and the plurality of volume values in the volume value range belong to a same volume level. Volume values of a same volume level correspond to a same volume gain, that is, same volume adjustment processing may be performed on the volume values of the same volume level.

In a possible implementation, the server may determine, based on volume level information, a first volume level to which the first volume value belongs and a second volume level to which the volume threshold belongs, where the volume level information includes a mapping relationship between a volume value and a volume level; and determine the first volume gain based on the first volume level, the second volume level, and second gain information. The second gain information includes a mapping relationship between a volume level and a volume gain.

In a possible implementation, when the first volume gain is greater than 1, the first target volume value is greater than the second volume value. Alternatively, when the first volume gain is equal to 1, the first target volume value is equal to the second volume value. Alternatively, when the first volume gain is less than 1, the first target volume value is less than the second volume value.

It should be noted that the second volume value in this embodiment of this application may be understood as a volume value currently set by the first terminal device, may be understood as a volume value used for playing previous audio of the first audio, or may be understood as a default volume value when the device is powered on or a player is enabled. The volume value used for playing the previous audio of the first audio may be a volume value manually adjusted by a user. This is not limited in this embodiment of this application.

It should be noted that the user may adjust playback volume of the terminal device in a personalized manner based on different listening environments and/or listening habits. For example, some users may increase playback volume on a noisy road, and some users may decrease the playback volume in a quiet library. For another example, some users prefer to listen to light music in high voice volume, and some users prefer to listen to rock music in low voice volume. Therefore, based on the playback volume (the second volume value) currently used by the user, the first terminal device may further obtain, with reference to the first volume gain, the first target volume value for playing the first audio, that is, use a product of the second volume value and the first volume gain as the first target volume value.

According to the volume adjustment method provided in this embodiment of this application, when the terminal device determines the first target volume value of the first audio, a listening habit and/or a listening scenario of the user are/is considered, so that a perception difference of the user when different audio is played can be further reduced.

In a possible implementation, the method further includes: A second terminal device sends a second playback request to the server, where the second playback request is used to request to play second audio on the second terminal device, and the second playback request carries a model of the second terminal device and an identifier of the second audio. When the server determines that the model of the second terminal device is different from the model of the first terminal device, the server determines a third volume value of the second audio based on the identifier of the second audio and the model of the first terminal device. The server determines, based on the third volume value and the volume threshold, a second volume gain for playing the second audio on the first terminal device. The server sends second volume control information to the second terminal device, where the second volume control information is used to indicate the second volume gain. The second terminal device determines, based on the second volume gain, a fourth volume value currently set by the second terminal device, and a volume distinguishing factor, a second target volume value for playing the second audio on the second terminal device, where the volume distinguishing factor indicates a volume difference between the first terminal device and the second terminal device. The second terminal device adjusts volume of playing the second audio to the second target volume value.

It should be noted that, because audio playback performance of terminal devices of different models is different, the first terminal device may be used as a standard device, and the volume distinguishing factor may indicate a difference between volume of a terminal device of another model and volume of the standard device.

Therefore, the server only needs to calculate a volume gain of each piece of audio played on the first terminal device, and a volume gain of a terminal device of another model may be obtained by calculating a product of the volume gain of the first terminal device and the volume distinguishing factor. That is, the server only needs to store gain information corresponding to the standard device and a volume distinguishing factor between the standard device and a terminal device of another model, and does not need to store gain information of terminal devices of each model, which can reduce a calculation amount and a storage amount of the server.

Optionally, the first terminal device may send a first volume report to the server, where the first volume report includes the model of the first terminal device, the identifier of the first audio, and the first target volume value, so that the server may perform the foregoing big data statistics based on the first volume report.

Optionally, when the first audio is played on the first terminal device with the first target volume value, the user may also manually adjust playback volume. Therefore, the first terminal device may also send a second volume report to the server, where the second volume report includes the model of the first terminal device, the identifier of the first audio, and the second target volume value, and the second target volume value is a volume value obtained by the user manually adjusting the first target volume value, so that the server can perform the foregoing big data statistics based on the second volume report.

Correspondingly, the server may further improve, based on the volume report, accuracy of the first volume value obtained through big data statistics.

According to a second aspect, an embodiment of this application further provides a volume adjustment method. The method includes:

A terminal device detects a playback request operation of a user, where the playback request operation is an operation of requesting to play first audio.

The terminal device determines, in response to the playback request operation, a first volume value of the first audio based on an identifier of the first audio and a model of the terminal device.

The terminal device determines, based on the first volume value and a volume threshold of the terminal device, a first volume gain for playing the first audio.

The terminal device determines, based on the first volume gain and a currently set second volume value, a first target volume value for playing the first audio.

The terminal device adjusts volume of playing the first audio to the first target volume value.

In a possible implementation, when the first volume gain is greater than 1, the first target volume value is greater than the second volume value. Alternatively, when the first volume gain is equal to 1, the first target volume value is equal to the second volume value. Alternatively, when the first volume gain is less than 1, the first target volume value is less than the second volume value.

In a possible implementation, that the terminal device determines, in response to the playback request operation, the first volume value of the first audio based on the identifier of the first audio and the model of the terminal device includes: The terminal device receives volume information sent by a server, where the volume information includes a mapping relationship between the identifier of the first audio, the model of the terminal device, and the first volume value. The terminal device determines the first volume value based on the identifier of the first audio, the model of the terminal device, and the volume information.

In a possible implementation, that the terminal device receives the volume information sent by the server includes: The terminal device sends a volume information request to the server, where the volume information request carries the identifier of the first audio and the model of the terminal device. The terminal device receives the volume information that is sent by the server based on the volume information request.

In other words, the method in the first aspect or the possible implementations of the first aspect may be completely implemented by a terminal device. The terminal device performs the method in the first aspect or the possible implementations of the first aspect, and various information required in an implementation process needs to be pre-stored in the terminal device. For example, the information includes volume information, volume level information, first gain information, second gain information, and the like.

Optionally, functions implemented by the server in the method in the first aspect or the possible implementations of the first aspect may also be implemented by a third terminal device, and the third terminal device may communicate with the first terminal device.

According to a third aspect, an embodiment of this application further provides a volume adjustment system. The system includes a first terminal device and a server. A communication connection is established between the first terminal device and the server.

The first terminal device is configured to send a first playback request to the server. The first playback request is used to request to play first audio on the first terminal device, and the first playback request carries a model of the first terminal device and an identifier of the first audio.

The server is configured to: determine a first volume value of the first audio based on the identifier of the first audio and the model of the first terminal device; determine, based on the first volume value and a volume threshold of the first terminal device, a first volume gain for playing the first audio on the first terminal device; and send first volume control information to the first terminal device, where the first volume control information is used to indicate the first volume gain.

The first terminal device is further configured to: determine, based on the first volume gain and a second volume value currently set by the first terminal device, a first target volume value for playing the first audio on the first terminal device; and adjust volume of playing the first audio to the first target volume value.

In a possible implementation, when the first volume gain is greater than 1, the first target volume value is greater than the second volume value. Alternatively, when the first volume gain is equal to 1, the first target volume value is equal to the second volume value. Alternatively, when the first volume gain is less than 1, the first target volume value is less than the second volume value.

In a possible implementation, the server is further configured to: receive a plurality of volume values before determining the first volume value of the first audio based on the identifier of the first audio and the model of the first terminal device, where the plurality of volume values include volume values set when a plurality of users play the first audio by using terminal devices that are of a same model as the first terminal device; and determine the first volume value based on the plurality of volume values.

In a possible implementation, the server is specifically configured to determine a volume value that is in the plurality of volume values and that is set for a largest quantity of times as the first volume value.

In a possible implementation, the server is specifically configured to determine an average value of the plurality of volume values as the first volume value.

In a possible implementation, the server is specifically configured to determine the first volume value based on the identifier of the first audio, the model of the first terminal device, and volume information. The volume information includes a mapping relationship between the identifier of the first audio, the model of the first terminal device, and the first volume value.

In a possible implementation, the system further includes a second terminal device. A communication connection is established between the second terminal device and the server. The second terminal device is configured to send a second playback request to the server, where the second playback request is used to request to play second audio on the second terminal device, and the second playback request carries a model of the second terminal device and an identifier of the second audio. The server is configured to: when determining that the model of the second terminal device is different from the model of the first terminal device, determine a third volume value of the second audio based on the identifier of the second audio and the model of the first terminal device; determine, based on the third volume value and the volume threshold, a second volume gain for playing the second audio on the first terminal device; and send second volume control information to the second terminal device, where the second volume control information is used to indicate the second volume gain. The second terminal device is further configured to: determine, based on the second volume gain, a fourth volume value currently set by the second terminal device, and a volume distinguishing factor, a second target volume value for playing the second audio on the second terminal device, where the volume distinguishing factor indicates a volume difference between the first terminal device and the second terminal device; and adjust volume of playing the second audio to the second target volume value.

According to a fourth aspect, an embodiment of this application further provides a volume adjustment apparatus, configured to perform the method in each of the foregoing aspects or any one of the possible implementations of each of the foregoing aspects. Specifically, the apparatus may include a unit configured to perform the method in each of the foregoing aspects or any one of the possible implementations of each of the foregoing aspects.

According to a fifth aspect, an embodiment of this application further provides a volume adjustment device. The volume adjustment device includes a processor and a transceiver. The processor and the transceiver communicate with each other through an internal connection path, and the processor is configured to implement the method in each of the foregoing aspects or any one of the possible implementations of each of the foregoing aspects.

Optionally, the volume adjustment device may be a terminal device or a server.

According to a sixth aspect, an embodiment of this application further provides a computer-readable storage medium, configured to store a computer program. The computer program includes instructions used to implement the method in each of the foregoing aspects or any one of the possible implementations of each of the foregoing aspects.

According to a seventh aspect, an embodiment of this application further provides a computer program product including instructions. When the computer program product runs on a computer, the computer is enabled to implement the method in each of the foregoing aspects or any one of the possible implementations of each of the foregoing aspects.

According to an eighth aspect, an embodiment of this application further provides a chip apparatus. The chip apparatus includes a communication interface and a processor. The communication interface and the processor communicate with each other through an internal connection path, and the processor is configured to implement the method in each of the foregoing aspects or any one of the possible implementations of each of the foregoing aspects.

DETAILED DESCRIPTION OF ILLUSTRATIVE EMBODIMENTS

The following describes technical solutions in this application with reference to the accompanying drawings.

Figure 1:
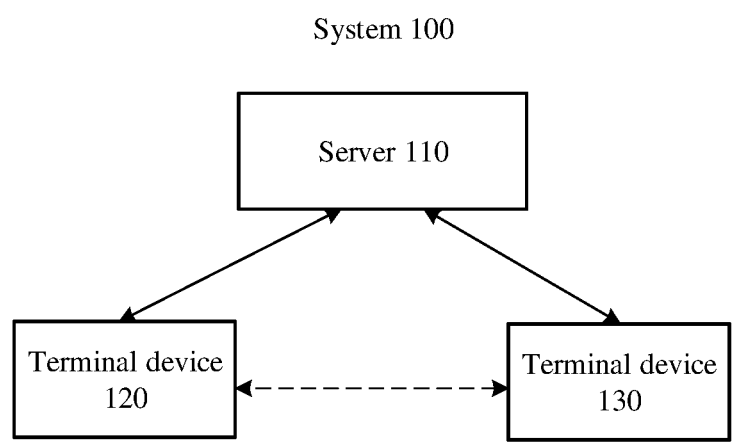
FIG. 1 is a schematic diagram of a volume adjustment system 100 according to an embodiment of this application.

FIG. 1 shows a schematic diagram of a volume adjustment system 100 according to an embodiment of this application. As shown in FIG. 1, the system 100 includes a server 110 and a plurality of terminal devices that communicate with the server 110, for example, a terminal device 120 and a terminal device 130 shown in FIG. 1.

It should be noted that the server 110 may be a device that has a computing function and a communication function. This is not limited in this embodiment of this application.

For example, the server may be a computer.

Optionally, the server 110 in this embodiment of this application may alternatively be a cloud server, for example, a cloud server.

It should be noted that a terminal device may be a device that has an audio playback function, a computing function, and/or a communication function. This is not limited in this embodiment of this application.

For example, the terminal device may be a (smart) speaker, a (smart) mobile phone, a (smart) vehicle-mounted device, a notebook computer, a (smart) television, or a wearable device.

Optionally, in this embodiment of this application, the plurality of terminal devices that communicate with the server 110 may also communicate with each other.

Optionally, the plurality of terminal devices may be of a same type or different types. This is not limited in this embodiment of this application.

In a possible implementation, the terminal device 120 and the terminal device 130 in FIG. 1 may be a sound box 1 and a sound box 2.

In another possible implementation, the terminal device 120 and the terminal device 130 in FIG. 1 may be a sound box and a television.

Optionally, the plurality of terminal devices of a same type may be of a same model or different models. This is not limited in this embodiment of this application.

In a possible implementation, the terminal device 120 and the terminal device 130 in FIG. 1 may be two sound boxes of a same model.

In a possible implementation, the terminal device 120 and the terminal device 130 in FIG. 1 may be two sound boxes of different models.

It should be noted that FIG. 1 shows only two terminal devices as an example. The system 100 may further include another quantity of terminal devices that communicate with the server 110. This is not limited in this embodiment of this application.

Figure 2:
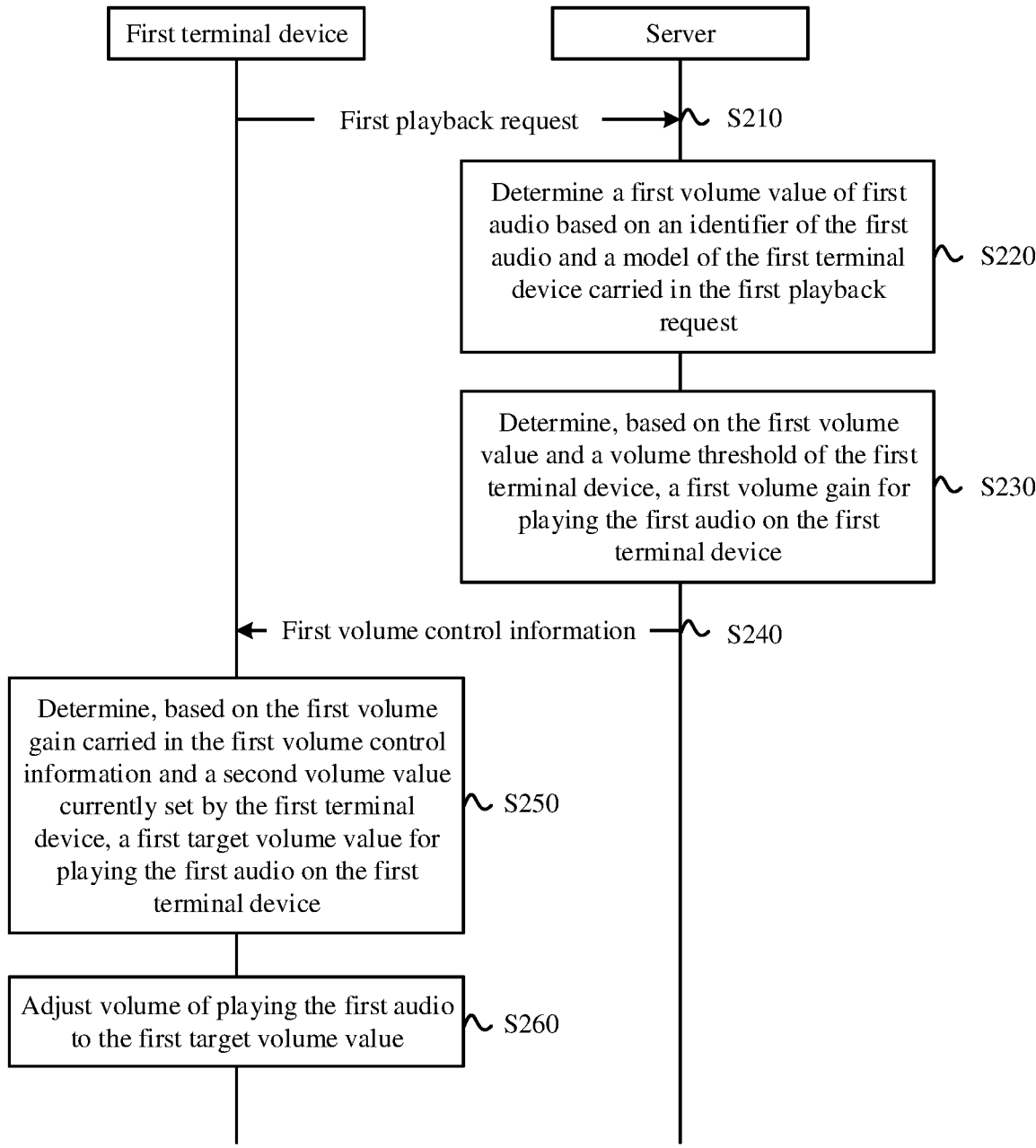
FIG. 2 is a schematic flowchart of a volume adjustment method 200 according to an embodiment of this application.

FIG. 2 shows a schematic diagram of a volume adjustment method 200 according to an embodiment of this application. As shown in FIG. 2, the method 200 may be applied to the system 100 shown in FIG. 1.

S210: A first terminal device sends a first playback request to a server, where the first playback request is used to request to play first audio on the first terminal device, and the first playback request carries a model of the first terminal device and an identifier of the first audio. Correspondingly, the server receives the first playback request sent by the first terminal device.

It should be noted that the first terminal device may be any terminal device (for example, the terminal device 120) in the system 100 shown in FIG. 1, and the server may be the server 110 in the system 100 shown in FIG. 1.

It should be further noted that the server may communicate with a plurality of terminal devices, that is, the server may provide services for the plurality of terminal devices. The plurality of terminal devices include the first terminal device.

Optionally, the server stores a plurality of pieces of audio, and each of the plurality of pieces of audio has a unique identifier. The plurality of pieces of audio include the first audio.

Optionally, the volume adjustment method provided in this embodiment of this application may be used to adjust volume of playing audio, or may be used to adjust volume of playing a video, or may be used to adjust volume of another file that can be listened to and played on the first terminal device. This is not limited in this embodiment of this application.

S220: The server determines a first volume value of the first audio based on the identifier of the first audio and the model of the first terminal device.

It should be noted that a volume value in this embodiment of this application is not a concept of decibel, and does not indicate an absolute volume value. The volume value in this embodiment of this application is a specific value, and the value indicates a proportional relationship between playback volume corresponding to the volume value and maximum playback volume of the first terminal device. A larger volume value indicates higher playback volume corresponding to the volume value, and a smaller volume value indicates lower playback volume corresponding to the volume value.

For example, playback volume corresponding to a volume value 100 is the maximum playback volume, and playback volume corresponding to a volume value 36 is 36% of the maximum playback volume.

It should be further noted that the first volume value in this embodiment of this application is a volume value with a good effect when the first audio is listened to.

Optionally, the server may determine the first volume value of the first audio in a plurality of manners based on the identifier of the first audio and the model of the first terminal device. This is not limited in this embodiment of this application.

In a possible implementation, the server may receive a plurality of volume values, where the plurality of volume values include volume values used when a plurality of users play the first audio by using terminal devices that are of a same model as the first terminal device; and determine the first volume value based on the plurality of volume values. In the plurality of volume values, some values are the same, and some values are different.

That is, the server may obtain, through big data statistics, a volume value with a good effect when audio is played on a terminal device of a model.

Figure 3:
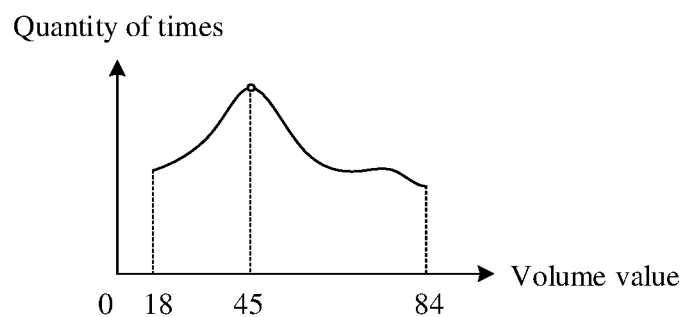
FIG. 3 is a schematic diagram of volume values based on big data statistics according to an embodiment of this application.

For example, FIG. 3 shows a statistical diagram, obtained through big data statistics, of volume values used when a plurality of users play first audio by using terminal devices of a first model. The server may use a volume value that appears most frequently in a plurality of volume values as a first volume value, that is, the first volume value may be 45 (as shown by a solid circle in FIG. 3). Alternatively, the server may use an average value of a plurality of volume values as a first volume value, that is, the first volume value may be 51 (as shown by a curve in FIG. 3, and may be determined based on a formula $$\sum_{i=18}^{84} \frac{i}{84-18+1} = 51 \Bigg).$$

In another possible implementation, the server may determine the first volume value of the first audio based on the identifier of the first audio, the model of the first terminal device, and volume information. The volume information includes a mapping relationship between the identifier of the first audio, the model of the first terminal device, and the first volume value.

It should be noted that the volume information includes a mapping relationship between an audio identifier, a device model, and a volume value, and indicates a volume value with a good effect when audio is played on a terminal device of a model.

For example, the volume information may be shown in the following Table 1:

TABLE 1

| Audio identifier | Device model | Volume value |
|---|---|---|
| 001 | AAA | 55 |
| 002 | AAA | 45 |
| ... | AAA | ... |
| 001 | BBB | 60 |
| 002 | BBB | 35 |
| ... | BBB | ... |
| ... | CCC | ... |
| ... | ... | ... |

Optionally, the server may obtain the volume information in a plurality of manners. This is not limited in this embodiment of this application.

In a first possible implementation, a person skilled in the art may configure the volume information for the server in advance.

In a second possible implementation, before S220, the server may obtain the volume information through big data statistics, and locally store the volume information. Correspondingly, in S220, the server may invoke the locally stored volume information.

In a third possible implementation, the server may obtain the volume information from another terminal device.

Optionally, the server may obtain the volume information from another terminal device in a plurality of manners. This is not limited in this embodiment of this application.

For example, the server may send a volume information request to the another terminal device. The volume information request carries the model of the first terminal device and the identifier of the first audio. The server receives the volume information that is sent by the another terminal device based on the volume information request.

For another example, the server may receive the volume information sent by the terminal device in a preset period.

S230: The server determines, based on the first volume value and a volume threshold of the first terminal device, a first volume gain for playing the first audio on the first terminal device.

It should be noted that the volume threshold in this embodiment of this application is a default volume value configured at delivery of the first terminal device. The default volume value may be measured by a person skilled in the art by using a professional measurement device before delivery. Therefore, it may be considered that a performance effect of the first terminal device is good when standard audio is played on the first terminal device with volume corresponding to the default volume value.

Optionally, the server may obtain the volume threshold in a plurality of manners. This is not limited in this embodiment of this application.

In a possible implementation, a person skilled in the art may preconfigure volume threshold information for the server. The volume threshold information includes a mapping relationship between the device model and the volume threshold.

In another possible implementation, the server may receive the volume threshold from another device, for example, a professional measurement device.

It should be noted that, when the first terminal device is used to play different audio, because volume varies during audio recording by different audio operators, a volume value (for example, the first volume value) with a good listening effect may vary to different degrees. That is, if the volume during audio recording is high, the first volume value is small; or if the volume during audio recording is low, the first volume value is large.

However, the default volume value configured at delivery (for example, the volume threshold) is a volume value with a good performance effect when the standard audio is played on the first terminal device. Therefore, for audio recorded by different audio operators, there is a difference between a volume value with a good listening effect and the default volume value. Therefore, the difference between the two volume values may be equalized by using the first volume gain.

It should be further noted that, because a performance effect of the first terminal device is good when the standard audio is played on the first terminal device with volume corresponding to the default volume value, it may be considered that a volume gain corresponding to the volume threshold is 1, that is, volume corresponding to the volume threshold is volume with good performance, and a volume increase or decrease operation does not need to be performed.

Optionally, the server may determine the first volume gain based on the first volume value, the volume threshold of the first terminal device, and first gain information. The first gain information includes a mapping relationship between a volume value and a volume gain.

For example, that a model of the first terminal device is AAA is used as an example. The first gain information may be shown in the following Table 2:

TABLE 2

| Device model | Volume value | Volume gain |
| --- | --- | --- |
| AAA | [1,16) | 0.6 |
| | [16,26) | 0.7 |
| | [26,31) | 0.8 |
| | [31,36) | 0.9 |
| | 36 | 1 |
| | (37,42] | 1.1 |
| | (42,47] | 1.2 |
| | (48,58] | 1.3 |
| | (59,74] | 1.4 |
| | (74,100] | 1.5 |

For example, as shown by a "black box" in Table 2, a volume threshold of the first terminal device is 36, and a volume gain corresponding to the volume threshold is 1. When a first volume value of first audio played on the first terminal device is 32, it may be learned from Table 2 that the first volume value is less than the volume threshold, and it indicates that most users listen to the first audio with volume lower than the volume threshold through the first terminal device, that is, original volume of the first audio is high during recording. Therefore, a volume gain corresponding to the first volume value on the first terminal device is 0.9. That is, a volume value of the first audio during original recording may be decreased by decreasing the volume gain. This can avoid a case in which volume changes abruptly, thereby improving user experience.

For another example, as shown by the "black box" in Table 2, the volume threshold of the first terminal device is 36, the volume gain corresponding to the volume threshold is 1. When a first volume value of the first audio played on the first terminal device is 45, it may be learned from Table 2 that the first volume value is greater than the volume threshold, and it indicates that most users listen to the first audio with volume higher than the volume threshold through the first terminal device, that is, original volume of the first audio is low during recording. Therefore, a volume gain corresponding to the first volume value on the first terminal device is 1.2. That is, a volume value of the first audio during original recording may be increased by increasing the volume gain. This can avoid a case in which volume changes abruptly, thereby improving user experience.

For another example, as shown by the "black box" in Table 2, the volume threshold of the first terminal device is 36, the volume gain corresponding to the volume threshold is 1. When a first volume value of the first audio played on the first terminal device is 36, it may be learned from Table 2 that the first volume value is equal to the volume threshold, and it indicates that most users listen to the first audio with volume of the volume threshold through the first terminal device, that is, the original volume of the first audio during recording is approximately consistent with the volume threshold of the first terminal device. Therefore, a volume gain corresponding to the first volume value on the first terminal device is 1.

Therefore, according to the volume adjustment method provided in this embodiment of this application, a user perception difference caused by a volume difference during audio recording can be avoided.

It should be noted that, in the first volume gain information, one volume gain may correspond to at least one volume value. When one volume gain corresponds to a plurality of volume values, it may be understood that the volume gain corresponds to a volume value range, and the plurality of volume values in the volume value range belong to a same volume level. Volume values of a same volume level correspond to a same volume gain, that is, same volume adjustment processing may be performed on the volume values of the same volume level.

Optionally, the server may determine, based on volume level information, a first volume level to which the first volume value belongs and a second volume level to which the volume threshold belongs, where the volume level information includes a mapping relationship between a volume value and a volume level; and determine the first volume gain based on the first volume level, the second volume level, and second gain information. The second gain information includes a mapping relationship between a volume level and a volume gain.

For example, the volume level information may be shown in the following Table 3:

TABLE 3

| Device model | Volume level | Volume value range |
|---|---|---|
| AAA | −4 | [1,16) |
| | −3 | [16,26) |
| | −2 | [26,31) |
| | −1 | [31,36) |
| | 0 | 36 |
| | 1 | (37,42] |
| | 2 | (42,47] |
| | 3 | (48,58] |
| | 4 | (59,74] |
| | 5 | (74,100] |

For example, the second gain information may be shown in the following Table 4:

TABLE 4

| Device model | Volume level | Volume gain |
|---|---|---|
| AAA | −4 | 0.6 |
| | −3 | 0.7 |
| | −2 | 0.8 |
| | −1 | 0.9 |
| | 0 | 1 |
| | 1 | 1.1 |
| | 2 | 1.2 |
| | 3 | 1.3 |
| | 4 | 1.4 |
| | 5 | 1.5 |

S240: The server sends first volume control information to the first terminal device, where the first volume control information is used to indicate the first volume gain. Correspondingly, the first terminal device receives the first volume control information sent by the server.

S250: The first terminal device determines, based on the first volume gain and a second volume value currently set by the first terminal device, a first target volume value for playing the first audio on the first terminal device.

It should be noted that the second volume value in this embodiment of this application may be understood as a volume value currently set by the first terminal device, may be understood as a volume value used for playing previous audio of the first audio, or may be understood as a default volume value when the device is powered on or a player is enabled. The volume value used for playing the previous audio of the first audio may be a volume value manually adjusted by a user. This is not limited in this embodiment of this application.

It should be noted that the user may adjust playback volume of the terminal device in a personalized manner based on different listening environments and/or listening habits. For example, some users may increase playback volume on a noisy road, and some users may decrease the playback volume in a quiet library. For another example, some users prefer to listen to light music in high voice volume, and some users prefer to listen to rock music in low voice volume. Therefore, based on the playback volume (the second volume value) currently used by the user, the first terminal device may further obtain, with reference to the first volume gain, the first target volume value for playing the first audio, that is, use a product of the second volume value and the first volume gain as the first target volume value.

For example, the server may determine the first target volume value $V_1$ by using the following formula (1):

$$V_1 = f(\alpha_1, \beta_1, V_{s1}, V_{m1}) \cdot V_{j1} \tag{1}$$

$\alpha_1$ represents a total quantity of persons counted by using big data, $V_{s1}$ represents a plurality of volume values set by the persons of the total quantity counted by using the big data when the first audio is played on a terminal device whose model is the same as that of the first terminal device, $\beta_1$ represents a ratio of a quantity of persons that use each of the plurality of volume values to the total quantity of persons counted by using the big data, and $V_{j1}$ represents the second volume value.

According to the volume adjustment method provided in this embodiment of this application, when the terminal device determines the first target volume value of the first audio, a listening habit and/or a listening scenario of a user are/is considered, so that a perception difference of the user when different audio is played can be further reduced.

S260: The first terminal device adjusts volume of playing the first audio to the first target volume value.

Optionally, after S260, the first terminal device may send a first volume report to the server, where the first volume report includes the model of the first terminal device, the identifier of the first audio, and the first target volume value, so that the server may perform the foregoing big data statistics based on the first volume report.

Optionally, when the first audio is played on the first terminal device with the first target volume value, the user may also manually adjust playback volume. Therefore, after S260, the first terminal device may also send a second volume report to the server, where the second volume report includes the model of the first terminal device, the identifier of the first audio, and the second target volume value, and the second target volume value is a volume value obtained by the user manually adjusting the first target volume value, so that the server can perform the foregoing big data statistics based on the second volume report.

Optionally, the first terminal device may set media playback volume to the first target volume value, or the first terminal device may set all volume, such as the media playback volume, ringtone volume, alarm volume, and call volume, to the first target volume value. This is not limited in this embodiment of this application.

Optionally, the function implemented by the first terminal device in S250 may also be implemented by the server.

Therefore, before S240, the first terminal device needs to report the currently set second volume value to the server.

Correspondingly, S240 may be replaced with the following: The server determines, based on the first volume gain and the second volume value of the first terminal device, a first target volume value used to play the first audio on the first terminal device.

Correspondingly, S250 may be replaced with the following: The server sends first volume control information to the first terminal device, where the first volume control information is used to indicate the first target volume value.

Optionally, the functions implemented by the server in S210 to S240 may also be implemented by the first terminal device.

In this case, S210 to S240 may be replaced with the following: A first terminal device detects a playback request operation of a user, where the playback request operation is an operation of requesting to play first audio; determine, in response to the playback request operation, a first volume value of the first audio based on an identifier of the first audio and a model of the terminal device; determine, based on the first volume value and a volume threshold of the terminal device, a first volume gain for playing the first audio.

It should be noted that, when the first terminal device performs the foregoing steps, various information required in S210 to S240 needs to be pre-stored in the first terminal device. For example, the information includes volume information, volume level information, first gain information, second gain information, and the like.

Optionally, the functions implemented by the server in S210 to S240 may also be implemented by a third terminal device, or the functions implemented by the server in S210 to S250 are all implemented by a third terminal device. The third terminal device may communicate with the first terminal device.

It should be noted that, to avoid repetition, specific implementation processes of the foregoing replacement processes are not described herein again.

It should be noted that, if the system 100 further includes a second terminal device, and a model of the second terminal device is the same as that of the first terminal device, the second terminal device may also adjust volume by using a method similar to S210 to S260.

Optionally, if the model of the second terminal device is different from the model of the first terminal device, the second terminal device may adjust the volume by using the following steps.

Step 1: A second terminal device sends a second playback request to the server, where the second playback request is used to request to play second audio on the second terminal device, and the second playback request carries a model of the second terminal device and an identifier of the second audio. Correspondingly, the server receives the second playback request sent by the second terminal device.

Step 2: When the server determines that the model of the second terminal device is different from the model of the first terminal device, the server determines a third volume value of the second audio based on the identifier of the second audio and the model of the first terminal device.

Step 3: The server determines, based on the third volume value and the volume threshold, a second volume gain for playing the second audio on the first terminal device.

Step 4: The server sends second volume control information to the second terminal device, where the second volume control information is used to indicate the second volume gain. Correspondingly, the second terminal device receives the second volume control information sent by the server.

Step 5: The second terminal device determines, based on the second volume gain, a fourth volume value currently set by the second terminal device, and a volume distinguishing factor, a second target volume value for playing the second audio on the second terminal device, where the volume distinguishing factor indicates a volume difference between the first terminal device and the second terminal device.

It should be noted that, because audio playback performance of terminal devices of different models is different, the first terminal device may be used as a standard device, and the volume distinguishing factor may indicate a difference between volume of a terminal device of another model and volume of the standard device.

Therefore, the server only needs to calculate a volume gain of each piece of audio played on the first terminal device, and a volume gain of a terminal device of another model may be obtained by calculating a product of the volume gain of the first terminal device and the volume distinguishing factor. That is, the server only needs to store gain information corresponding to the standard device and a volume distinguishing factor between the standard device and a terminal device of another model, and does not need to store gain information of terminal devices of each model, which can reduce a calculation amount and a storage amount of the server.

For example, the server may determine the second target volume value $V_2$ by using the following formula (2):

$$V_2 = f(\alpha_2, \beta_2, V_{s2}, V_{m2}) \cdot \mu \cdot V_{j2} \qquad (2)$$

$\alpha_2$ represents a total quantity of persons counted by using big data, $V_{s2}$ represents a plurality of volume values set by the persons of the total quantity counted by using the big data when the first audio is played on a terminal device whose model is the same as that of the first terminal device, $\beta_2$ represents a ratio of a quantity of persons that use each of the plurality of volume values to the total quantity of persons counted by using the big data, $V_{j2}$ represents the second volume value, and $\mu$ represents the volume distinguishing factor.

Step 6: The second terminal device adjusts volume of playing the second audio to the second target volume value.

The foregoing describes the volume adjustment methods provided in the embodiments of this application with reference to FIG. 1 to FIG. 3. The following describes a volume adjustment device provided in an embodiment of this application with reference to FIG. 4.

It should be noted that the volume adjustment device may be the first terminal device, the second terminal device, the third terminal device, or the server in the embodiment of the method 100, and is configured to implement the functions implemented by the first terminal device, the second terminal device, the third terminal device, or the server. This is not limited in embodiments of this application.

Figure 4:
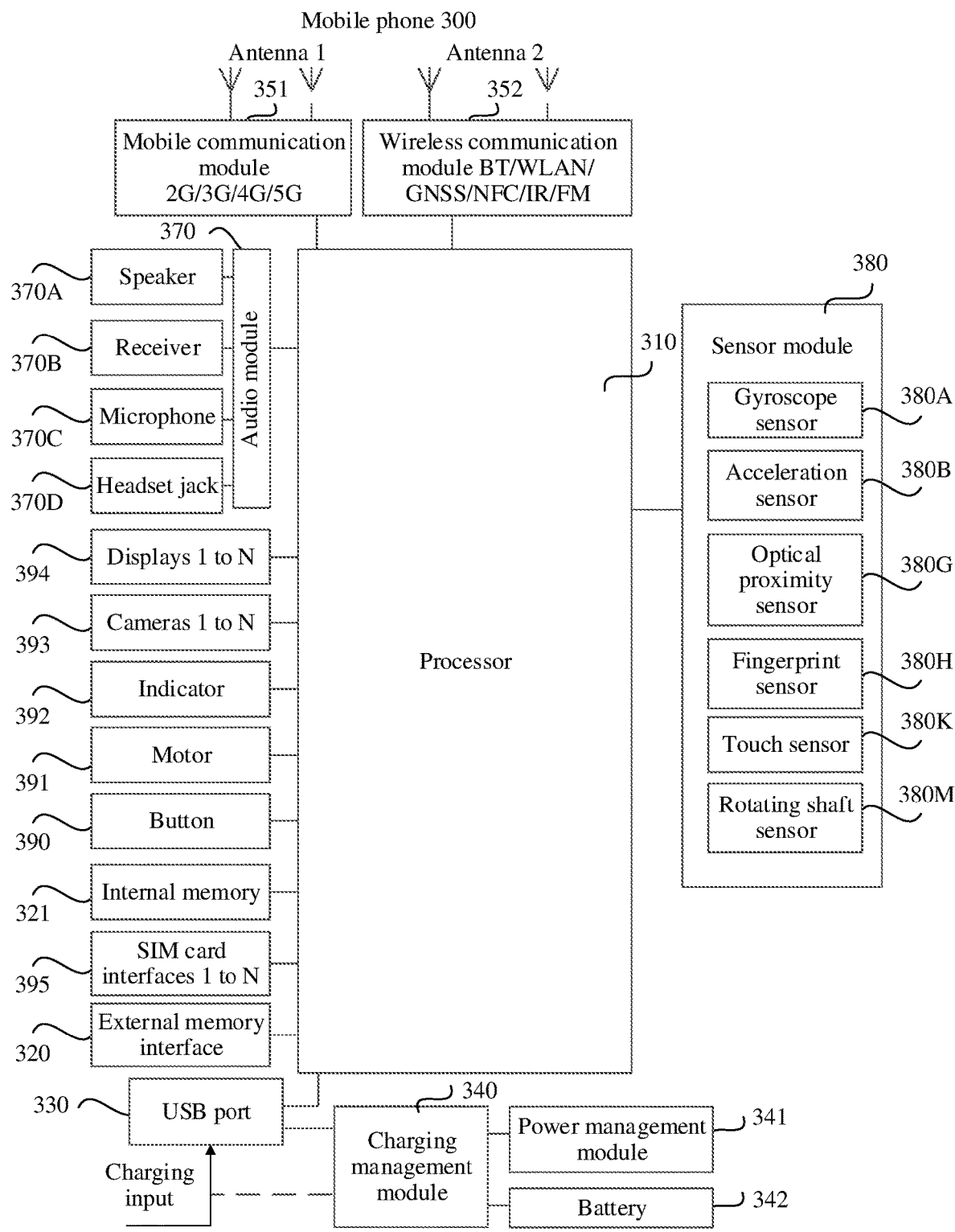
FIG. 4 is a schematic diagram of a volume adjustment device 300 according to an embodiment of this application.

For example, the volume adjustment device is a mobile phone. FIG. 4 shows a schematic diagram of a mobile phone 300 according to an embodiment of this application.

The mobile phone 300 may include a processor 310, an external memory interface 320, an internal memory 321, a USB interface 330, a charging management module 340, a power management module 341, a battery 342, an antenna 1, an antenna 2, a mobile communication module 351, a wireless communication module 352, an audio module 370, a speaker 370A, a receiver 370B, a microphone 370C, a headset jack 370D, a sensor module 380, a button 390, a motor 391, an indicator 392, a camera 393, a display 394, a SIM card interface 395, and the like. The sensor module 380 may include a gyroscope sensor 380A, an acceleration sensor 380B, an optical proximity sensor 380G, a fingerprint sensor 380H, a touch sensor 380K, and a rotating shaft sensor 380M (certainly, the mobile phone 300 may further include another sensor, for example, a temperature sensor, a pressure sensor, a distance sensor, a magnetic sensor, an ambient light sensor, a barometric pressure sensor, or a bone conduction sensor, which is not shown in the figure).

It may be understood that the structure illustrated in this embodiment of this application does not constitute a specific limitation on the mobile phone 300. In some other embodiments of this application, the mobile phone 300 may include more or fewer components than components shown in the figure, or some components may be combined, or some components may be split, or there may be a different component arrangement. The components shown in the figure may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (Neural-network Processing unit, NPU), and/or the like. Different processing units may be independent components, or may be integrated into one or more processors. The controller may be a nerve center and a command center of the mobile phone 300. The controller may generate an operation control signal based on an instruction operation code and a time sequence signal, to complete control of instruction fetching and instruction execution.

A memory may further be disposed in the processor 310, and is configured to store instructions and data. In some embodiments, the memory in the processor 310 is a cache memory. The memory may store instructions or data that has just been used or has been repeatedly used by the processor 310. If the processor 310 needs to reuse the instructions or the data, the processor 310 may directly invoke the instructions or the data from the memory. This avoids repeated access and reduces waiting time of the processor 310, thereby improving system efficiency.

The processor 310 may run functions implemented by the first terminal device, the second terminal device, the third terminal device, or the server in the method 100 provided in this application.

When different components are integrated into the processor 310, for example, a CPU and a GPU are integrated, the CPU and the GPU may cooperate to perform the processing method provided in the embodiments of this application. For example, in the processing method, some algorithms are performed by the CPU, and the other algorithms are performed by the GPU, to obtain relatively fast processing efficiency.

The display 394 is configured to display an image, a video, and the like. The display 394 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini LED, a micro LED, a micro OLED, a quantum dot light-emitting diode (quantum dot light emitting diodes, QLED), or the like. In some embodiments, the mobile phone 300 may include one or N displays 394, where N is a positive integer greater than 1.

The camera 393 (which may be a front-facing camera or a rear-facing camera, or one camera may serve as either a front-facing camera or a rear-facing camera) is used to capture a static image or video. Generally, the camera 393 may include a photosensitive element such as a lens group and an image sensor. The lens group includes a plurality of lenses (convex lenses or concave lenses), and is configured to collect an optical signal reflected by a to-be-photographed object and transmit the collected optical signal to the image sensor. The image sensor generates an original image of the to-be-photographed object based on the optical signal.

The internal memory 321 may be configured to store computer-executable program code, where the executable program code includes instructions. The processor 310 runs the instructions stored in the internal memory 321, to perform various function applications of the mobile phone 300 and signal processing. The internal memory 321 may include a program storage region and a data storage region. The program storage region may store code of an operating system, an application (for example, a camera application or a WeChat application), and the like. The data storage region may store data (for example, an image or video collected by the camera application) created in a process of using the mobile phone 300, and the like.

The internal memory 321 may further store code of an anti-accidental touch algorithm provided in this embodiment of this application. When the code, stored in the internal memory 321, of the anti-accidental touch algorithm is run by the processor 310, a touch operation in a folding or unfolding process may be shielded.

In addition, the internal memory 321 may include a high-speed random access memory, and may further include a nonvolatile memory, for example, at least one magnetic disk storage device, a flash memory device, or a universal flash storage (universal flash storage, UFS).

Certainly, code for implementing a video editing algorithm provided in this embodiment of this application may alternatively be stored in an external memory. In this case, the processor 310 may run, by using the external memory interface 320, the code of the algorithm stored in the external memory, to edit a video.

The following describes functions of the sensor module 380.

The gyroscope sensor 380A may be configured to determine a motion posture of the mobile phone 300. In some embodiments, the gyroscope sensor 380A may be used to determine angular velocities of the mobile phone 300 around three axes (namely, x, y, and z axes). In other words, the gyroscope sensor 380A may be configured to detect a current motion status of the mobile phone 300, for example, a shaken or static state.

The acceleration sensor 380B may detect values of acceleration in various directions (usually on three axes) of the mobile phone 300. In other words, the gyroscope sensor 380A may be configured to detect a current motion status of the mobile phone 300, for example, a shaken or static state.

For example, the optical proximity sensor 380G may include a light-emitting diode (LED) and an optical detector, for example, a photodiode. The light-emitting diode may be an infrared light-emitting diode. The mobile phone emits infrared light by using the light-emitting diode. The mobile phone detects infrared reflected light from a nearby object by using the photodiode. When sufficient reflected light is detected, the mobile phone may determine that there is an object near the mobile phone. When insufficient reflected light is detected, the mobile phone may determine that there is no object near the mobile phone.

The gyroscope sensor 380A (or the acceleration sensor 380B) may send detected motion status information (for example, an angular velocity) to the processor 310. The processor 310 determines, based on the motion status information, whether the mobile phone is currently in a handheld state or a tripod state (for example, when the angular velocity is not 0, it indicates that the mobile phone 300 is in the handheld state).

The fingerprint sensor 380H is configured to collect a fingerprint. The mobile phone 300 may use a feature of the collected fingerprint to implement fingerprint-based unlocking, application access locking, fingerprint-based photographing, fingerprint-based call answering, and the like.

The touch sensor 380K may also be referred to as a "touch panel". The touch sensor 380K may be disposed in the display 394. The touch sensor 380K and the display 394 form a touchscreen, which is also referred to as a "touch screen". The touch sensor 380K is configured to detect a touch operation on or near the touch sensor 380K. The touch sensor may transfer the detected touch operation to the application processor to determine a type of a touch event. A visual output related to the touch operation may be provided through the display 394. In some other embodiments, the touch sensor 380K may alternatively be disposed on a surface of the mobile phone 300 at a location different from a location of the display 394.

For example, the display 394 of the mobile phone 300 displays a home screen, and the home screen includes icons of a plurality of applications (for example, a camera application and a WeChat application). The user taps the icon of the camera application on the home screen by using the touch sensor 380K, to trigger the processor 310 to enable the camera application and turn on the camera 393. The display 394 displays an interface of the camera application, for example, a viewfinder interface.

A wireless communication function of the mobile phone 300 may be implemented by using the antenna 1, the antenna 2, the mobile communication module 351, the wireless communication module 352, the modem processor, the baseband processor, and the like.

The antenna 1 and the antenna 2 are configured to transmit and receive electromagnetic wave signals. Each antenna in the mobile phone 300 may be configured to cover one or more communication frequency bands. Different antennas may be multiplexed to improve antenna utilization. For example, the antenna 1 may be multiplexed as a diversity antenna in a wireless local area network. In some other embodiments, an antenna may be used in combination with a tuning switch.

The mobile communication module 351 may provide a solution, applied to the mobile phone 300, for wireless communication including 3G/3G/4G/5G. The mobile communication module 351 may include at least one filter, a switch, a power amplifier, a low noise amplifier (low noise amplifier, LNA), and the like. The mobile communication module 351 may receive an electromagnetic wave through the antenna 1, perform processing such as filtering and amplification on the received electromagnetic wave, and transmit a processed electromagnetic wave to the modem processor for demodulation. The mobile communication module 351 may further amplify a signal modulated by the modem processor, and convert the signal into an electromagnetic wave through the antenna 1 for radiation. In some embodiments, at least some functional modules of the mobile communication module 351 may be disposed in the processor 310. In some embodiments, at least some functional modules of the mobile communication module 351 and at least some modules of the processor 310 may be disposed in a same component.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 370A, the receiver 370B, or the like), or displays an image or video through the display 394. In some embodiments, the modem processor may be an independent component. In some other embodiments, the modem processor may be independent of the processor 310, and disposed in a same component as the mobile communication module 351 or another functional module.

The wireless communication module 352 may provide a solution, applied to the mobile phone 300, for wireless communication, including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication technology (near field communication, NFC), and an infrared (infrared, IR) technology. The wireless communication module 352 may be one or more components integrating at least one communication processing module. The wireless communication module 352 receives an electromagnetic wave signal through the antenna 2, modulates and performs filtering processing on the electromagnetic wave signal, and sends a processed signal to the processor 310. The wireless communication module 352 may further receive a to-be-sent signal from the processor 310, modulate and amplify the received signal, and convert a signal into an electromagnetic wave through the antenna 2 for radiation.

In some embodiments, the antenna 1 of the mobile phone 300 is coupled to the mobile communication module 351, and the antenna 2 is coupled to the wireless communication module 352, so that the mobile phone 300 can communicate with a network and another device by using a wireless communication technology. The wireless communication technology may include a global system for mobile communication (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, the GNSS, the WLAN, the NFC, the FM, the IR technology, and/or the like. The GNSS may include a global positioning system (global positioning system, GPS), a global navigation satellite system (global navigation satellite system, GLONASS), a BeiDou navigation satellite system (Beidou navigation satellite system, BDS), a quasi-zenith satellite system (quasi-zenith satellite system, QZSS), and/or a satellite based augmentation system (satellite based augmentation systems, SBAS).

In addition, the mobile phone 300 may implement an audio function such as music playing or recording through the audio module 370, the speaker 370A, the receiver 370B, the microphone 370C, the headset jack 370D, the application processor, and the like. The mobile phone 300 may receive an input from the button 390, and generate a button signal input related to a user setting and function control of the mobile phone 300. The mobile phone 300 may generate a vibration prompt (for example, an incoming call vibration prompt) by using the motor 391. The indicator 392 in the mobile phone 300 may be an indicator light that may be configured to indicate a charging state and a battery power change, and may be further configured to indicate a message, a missed call, a notification, and the like. The SIM card interface 395 in the mobile phone 300 is configured to connect to a SIM card. The SIM card may be inserted into the SIM card interface 395 or removed from the SIM card interface 395, to implement contact with or separation from the mobile phone 300.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, the apparatus, and the method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, to be specific, may be located in one position, or may be distributed on a plurality of network units. Some or all of the units may be selected according to actual requirements to achieve the objectives of the solutions in the embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on this understanding, the technical solutions of this application essentially, or the part contributing to the conventional technology, or some of the technical solutions may be implemented in a form of a software product. The computer software product is stored in a storage medium, and includes several instructions for instructing a computer device (which may be, for example, a personal computer, a server, or a network device) to perform all or some of the steps of the methods described in the embodiments of this application. The storage medium includes any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A volume adjustment method, comprising:
    sending, by a first terminal device, a first playback request to a server, wherein the first playback request requests to play first audio on the first terminal device, and wherein the first playback request carries a model of the first terminal device and an identifier of the first audio;
    determining, by the server, a first volume value of the first audio based on the identifier of the first audio and the model of the first terminal device;
    determining, by the server based on the first volume value and a volume threshold of the first terminal device, a first volume gain for playing the first audio on the first terminal device;
    sending, by the server, first volume control information to the first terminal device, wherein the first volume control information indicates the first volume gain;
    determining, by the first terminal device based on the first volume gain and a second volume value currently set by the first terminal device, a first target volume value for playing the first audio on the first terminal device;
    adjusting, by the first terminal device, a volume of playing the first audio to the first target volume value;
    sending, by a second terminal device, a second playback request to the server, wherein the second playback request requests to play second audio on the second terminal device, and the second playback request carries a model of the second terminal device and an identifier of the second audio; and
    determining, by the server, based on the server determining that the model of the second terminal device is different from the model of the first terminal device, a third volume value of the second audio based on the identifier of the second audio and the model of the first terminal device.

2. The method according to claim 1, wherein determining, by the first terminal device based on the first volume gain and the second volume value currently set by the first terminal device, the first target volume value for playing the first audio on the first terminal device comprises:
  setting the first target volume value to greater than the second volume value based on the first volume gain being greater than 1;
  setting the first target volume value equal to the second volume value based on the first volume gain being equal to 1; or
  setting the first target volume value to less than the second volume value based on the first volume gain being less than 1.

3. The method according to claim 1, wherein before the determining, by the server, the first volume value of the first audio based on the identifier of the first audio and the model of the first terminal device, the method further comprises:
  receiving, by the server, a plurality of volume values, wherein the plurality of volume values comprise volume values set when a plurality of users play the first audio by using terminal devices that are of a same model as the first terminal device; and
  determining, by the server, the first volume value based on the plurality of volume values.

4. The method according to claim 3, wherein the determining, by the server, the first volume value based on the plurality of volume values comprises:
  determining, by the server, a volume value that is in the plurality of volume values and that is set for a largest quantity of times as the first volume value.

5. The method according to claim 3, wherein the determining, by the server, the first volume value based on the plurality of volume values comprises:
  determining, by the server, an average value of the plurality of volume values as the first volume value.

6. The method according to claim 1, wherein the determining, by the server, the first volume value of the first audio based on the identifier of the first audio and the model of the first terminal device comprises:
  determining, by the server, the first volume value based on the identifier of the first audio, the model of the first terminal device, and volume information, wherein the volume information comprises a mapping relationship between the identifier of the first audio, the model of the first terminal device, and the first volume value.

7. The method according to claim 1, wherein the method further comprises:
  determining, by the server based on the third volume value and the volume threshold, a second volume gain for playing the second audio on the first terminal device;
  sending, by the server, second volume control information to the second terminal device, wherein the second volume control information indicates the second volume gain;
  determining, by the second terminal device based on the second volume gain, a fourth volume value currently set by the second terminal device, and a volume distinguishing factor, a second target volume value for playing the second audio on the second terminal device, wherein the volume distinguishing factor indicates a volume difference between the first terminal device and the second terminal device; and
  adjusting, by the second terminal device, volume of playing the second audio to the second target volume value.

8. A volume adjustment method, comprising:
  detecting, by a first terminal device, a playback request operation of a user, wherein the playback request operation is an operation of requesting to play first audio;
  determining, by the first terminal device in response to the playback request operation, a first volume value of the first audio based on an identifier of the first audio and a model of the first terminal device;
  receiving, from a server, based on the first volume value and a volume threshold of the first terminal device, volume control information that indicates a first volume gain for playing the first audio, wherein the first volume gain is determined by the server based on:
    determining the first terminal device is different from a second terminal device; and
    determining a second volume gain related to the first audio and the second terminal device;
  determining, by the first terminal device, based on the first volume gain and a currently set second volume value, a first target volume value for playing the first audio; and
  adjusting, by the first terminal device, volume of playing the first audio to the first target volume value.

9. The method according to claim 8, wherein determining, by the first terminal device based on the first volume gain and a currently set second volume value, a first target volume value for playing the first audio comprises:
  setting the first target volume value to greater than the second volume value based on the first volume gain being greater than 1;
  setting the first target volume value equal to the second volume value based on the first volume gain being equal to 1; or
  setting the first target volume value to less than the second volume value based on the first volume gain being less than 1.

10. The method according to claim 8, wherein the determining, by the first terminal device in response to the playback request operation, the first volume value of the first audio based on the identifier of the first audio and the model of the first terminal device comprises:
  receiving, by the first terminal device, volume information sent by the server, wherein the volume information comprises a mapping relationship between the identifier of the first audio, the model of the first terminal device, and the first volume value; and
  determining, by the first terminal device, the first volume value based on the identifier of the first audio, the model of the first terminal device, and the volume information.

11. The method according to claim 10, wherein the receiving, by the first terminal device, the volume information sent by the server comprises:
  sending, by the first terminal device, a volume information request to the server, wherein the volume information request carries the identifier of the first audio and the model of the first terminal device; and
  receiving, by the first terminal device, the volume information sent by the server based on the volume information request.

12. A volume adjustment system, comprising:
  a first terminal device;
  a second terminal device; and
  a server, wherein a communication connection is established between the first terminal device and the server;

wherein the first terminal device is configured to:
send a first playback request to the server, wherein the first playback request requests to play first audio on the first terminal device, and the first playback request carries a model of the first terminal device and an identifier of the first audio;
wherein the server is configured to:
determine a first volume value of the first audio based on the identifier of the first audio and the model of the first terminal device;
determine, based on the first volume value and a volume threshold of the first terminal device, a first volume gain for playing the first audio on the first terminal device; and
send first volume control information to the first terminal device, wherein the first volume control information indicates the first volume gain;
wherein the first terminal device is further configured to:
determine, based on the first volume gain and a second volume value currently set by the first terminal device, a first target volume value for playing the first audio on the first terminal device; and
adjust volume of playing the first audio to the first target volume value;
wherein the second terminal device is configured to send a second playback request to the server, wherein the second playback request requests to play second audio on the second terminal device, and the second playback request carries a model of the second terminal device and an identifier of the second audio; and
wherein the server is configured to:
determine, based on determining that the model of the second terminal device is different from the model of the first terminal device, a third volume value of the second audio based on the identifier of the second audio and the model of the first terminal device.

13. The system according to claim 12, wherein determine, based on the first volume value and a volume threshold of the first terminal device, a first volume gain for playing the first audio on the first terminal device comprises:
setting the first target volume value to greater than the second volume value based on the first volume gain being greater than 1;
setting the first target volume value equal to the second volume value based on the first volume gain being equal to 1; or
setting the first target volume value is less than the second volume value based on the first volume gain being less than 1.

14. The system according to claim 12, wherein the server is further configured to:
receive a plurality of volume values before determining the first volume value of the first audio based on the identifier of the first audio and the model of the first terminal device, wherein the plurality of volume values comprise volume values set when a plurality of users play the first audio by using terminal devices that are of a same model as the first terminal device; and
determine the first volume value based on the plurality of volume values.

15. The system according to claim 14, wherein the server is configured to determine a volume value that is in the plurality of volume values and that is set for a largest quantity of times as the first volume value.

16. The system according to claim 14, wherein the server is configured to determine an average value of the plurality of volume values as the first volume value.

17. The system according to claim 12, wherein the server is configured to determine the first volume value based on the identifier of the first audio, the model of the first terminal device, and volume information, wherein the volume information comprises a mapping relationship between the identifier of the first audio, the model of the first terminal device, and the first volume value.

18. The system according to claim 12,
wherein the server is further configured to:
determine, based on the third volume value and the volume threshold, a second volume gain for playing the second audio on the first terminal device; and
send second volume control information to the second terminal device, wherein the second volume control information indicates the second volume gain; and
wherein the second terminal device is further configured to:
determine, based on the second volume gain, a fourth volume value currently set by the second terminal device, and a volume distinguishing factor, a second target volume value for playing the second audio on the second terminal device, wherein the volume distinguishing factor indicates a volume difference between the first terminal device and the second terminal device; and
adjust volume of playing the second audio to the second target volume value.

* * * * *